(12) United States Patent
Lewis

(10) Patent No.: US 11,105,411 B2
(45) Date of Patent: Aug. 31, 2021

(54) SECONDARY LUBRICATION FOR GEARS AND GEARBOXES

(71) Applicant: Sikorsky Aircraft Corporation, Stratford, CT (US)

(72) Inventor: Shane Lewis, Milford, CT (US)

(73) Assignee: Sikorsky Aircraft Corporation, Stratford, CT (US)

( * ) Notice: Subject to any disclaimer, the term of this patent is extended or adjusted under 35 U.S.C. 154(b) by 271 days.

(21) Appl. No.: 15/908,343

(22) Filed: Feb. 28, 2018

(65) Prior Publication Data

US 2019/0264799 A1    Aug. 29, 2019

(51) Int. Cl.
*F16H 1/06* (2006.01)
*F16H 55/17* (2006.01)
*F16H 57/04* (2010.01)

(52) U.S. Cl.
CPC ........... *F16H 57/0431* (2013.01); *F16H 1/06* (2013.01); *F16H 55/17* (2013.01); *F16H 57/041* (2013.01)

(58) Field of Classification Search
CPC .. F16H 57/0447; F16H 57/0431; F16H 57/04; F16H 57/041; F16H 57/0412; F16H 57/0428; F16H 57/043; F16N 29/02; F16N 29/00; F16N 2210/12; F16N 2210/08
USPC .................................................... 184/99, 98
See application file for complete search history.

(56) References Cited

U.S. PATENT DOCUMENTS

| | | | | |
|---|---|---|---|---|
| 3,590,957 A | * | 7/1971 | Campbell | F16C 19/52 184/99 |
| 4,601,592 A | * | 7/1986 | Jatczak | F16C 33/605 384/564 |
| 5,976,048 A | * | 11/1999 | Sudau | F16F 15/1206 464/68.3 |
| 8,196,489 B2 | * | 6/2012 | Paluncic | F16H 55/088 74/468 |
| 2007/0175706 A1 | * | 8/2007 | Shilo | F16H 57/0427 184/6.12 |
| 2009/0143178 A1 | * | 6/2009 | Sakura | F16H 55/30 474/152 |

(Continued)

FOREIGN PATENT DOCUMENTS

DE  3321732 A1  12/1984
DE  3730916 A1   3/1989

(Continued)

*Primary Examiner* — Jake Cook
*Assistant Examiner* — Gregory Robert Weber
(74) *Attorney, Agent, or Firm* — Michael Best & Friedrich LLP

(57) ABSTRACT

A solid lubricant-carrying gear which is lubricated by a liquid lubricant communicated to the gear by a primary lubrication system includes a gear body and a solid lubricant body. The gear body is arranged along a rotation axis and has a first surface, an axially opposite second surface, and an outward radial face extending about the rotation axis having gear teeth and lubricant directing features. The solid lubricant body is coupled to the gear body and includes a lubricant which melts at a melting temperature above that of the liquid lubricant to provide secondary lubrication to the gear via the lubricant directing features. Gearboxes, aircraft having transmissions employing solid lubricant-carrying gears, and methods of lubricating gears are also described.

20 Claims, 8 Drawing Sheets

(56) References Cited

U.S. PATENT DOCUMENTS

| | | | |
|---|---|---|---|
| 2015/0260274 A1* | 9/2015 | Sammataro | F16H 57/0442 |
| | | | 415/122.1 |
| 2017/0082189 A1* | 3/2017 | Paal | F16N 25/04 |
| 2017/0175706 A1* | 6/2017 | Pendergrass | H02K 7/183 |
| 2019/0186691 A1* | 6/2019 | LaBerge | F16N 25/00 |

FOREIGN PATENT DOCUMENTS

| | | | | |
|---|---|---|---|---|
| DE | 102008058949 A1 * | 6/2010 | | F16H 57/043 |
| DE | 102011006276 A1 * | 10/2012 | | F16H 57/0431 |
| JP | 2002054696 A | 2/2002 | | |
| JP | 2004076814 A | 3/2004 | | |
| JP | 2004225768 A * | 8/2004 | | F16H 57/0498 |
| JP | 5669003 B2 | 2/2015 | | |
| WO | WO-2019003971 A1 * | 1/2019 | | F16H 57/04 |

\* cited by examiner

SECONDARY LUBRICATION FOR GEARS AND GEARBOXES

BACKGROUND OF THE INVENTION

1. Field of the Invention

The present disclosure relates to gearboxes, and more particularly to solid lubricant-carrying gears for gearboxes in vehicles like helicopters.

2. Description of Related Art

Vehicles like helicopters commonly employ a drive train with gears to communicate rotational energy from an engine to a rotor system. The drive train is typically configured to transmit torque from the one or more engines to at least the main and tail rotors to drive rotation of the rotors about the respective axes of rotation. Since gears are generally subject to friction due to sliding and rolling contact with one another lubrication is typically required for cooling and limiting resistance between contacting surfaces of drive train components.

In some lubrication system redundancy is required. Redundancy is typically provided by a secondary lubrication system, which provides lubrication to certain drive train components during intervals when lubricant flow from the primary lubrication system ceases or is diminished, such as in an oil-out event. Such secondary lubrication systems typically prolong the time period during which the vehicle can be operated without the intended flow of primary lubricant. In many cases, the secondary lubrication systems rely on sensors to detect failures in the primary lubrication systems and may be initiated automatically or manually by an operator. In either case, the secondary lubrication systems are themselves prone to failures or are subject to operator error.

Such conventional methods and systems have generally been considered satisfactory for their intended purpose. However, there is still a need in the art for improved gears, gear boxes, and methods of providing secondary lubrication to gears in rotorcraft gearboxes. The present disclosure provides a solution for this need.

SUMMARY OF THE INVENTION

A solid lubricant-carrying gear which is lubricated by a liquid lubricant communicated to the gear by a primary lubrication system includes a gear body and a solid lubricant body. The gear body is arranged along a rotation axis and has a first surface, an axially opposite second surface, and an outward radial face extending about the rotation axis having gear teeth and lubricant directing features. The solid lubricant body is coupled to the gear body and includes a solid lubricant which melts at a temperature above that of the liquid lubricant to provide second lubrication to the gear teeth via the lubricant directing features.

In certain embodiments the lubricant body can be arranged radially between the rotation axis and the outward radial face of the gear body. The lubricant body can be positioned against the first surface of the gear body. The lubricant body can be positioned against the second surface of the gear body. The lubricant body can be a first lubricant body, the gear can include a second lubricant body, and the first lubricant body positioned on the gear body first surface and the second lubricant body positioned on the gear body second surface.

In accordance with certain embodiments, the lubricant directing features can include one more channel. The channel can extend radially from the lubricant body to a bottom land of gear teeth arranged about the gear body outward radial face. The channel can extend across the first surface and/or the second surface of the gear body. The channel can extend through the gear body. It is also contemplated that the lubricant body can be positioned on the radially outer face of the gear body and within a bottom land defined between adjacent gear teeth arranged on the radially outer face of the gear body.

It is also contemplated that, in accordance with certain embodiments, a bracket can be fixed to the gear body. The bracket can be arranged to direct lubricant issuing from the lubricant body radially outward from the rotation axis of the gear body. The bracket can axially overlap the lubricant body. The bracket can bound radially extending channel coupling the lubricant body with a bottom land of gear teeth arranged about the gear body outward radial face. The bracket can be press fit, fastened, adhered or bonded to the first surface of the gear body. The bracket can be a first bracket and a second bracket can fixed to the gear body second surface.

A gearbox to transmit torque from an engine to a driven element includes a housing and a gear train. The gear train has a gear as described above supported for rotation about the rotation axis within the housing. The solid lubricant body is arranged radially between the rotation axis and the outward radial face of the gear body. A liquid lubricant is disposed within the housing to lubricate the first gear as the first gear intermeshes with a second gear of the gear train.

The lubricant body can be a first lubricant body position on the first surface and a second lubricant body can be positioned on the gear body second surface. The lubricant body can be positioned on the radially outer face of the gear body and within a bottom land defined between adjacent gear teeth arranged on the radially outer face of the gear body. It is contemplated that an aircraft can have a transmission system including a transmission system with a solid lubricant-carrying gear as described above.

A method of lubricating a gear includes heating a solid lubricant body carried by the solid lubricant-carrying gear and melting the solid lubricant body using the heat communicated by the solid lubricant-carrying gear. The melted lubricant from the solid lubricant body can be directed into a space between adjacent pairs of gear teeth of the solid lubricant-carrying gear. The gear is cooled using the directed liquid lubricant issuing from the melting solid lubricant body. In certain embodiments torque can be communicated through the solid lubricant-carrying gear and an intermeshed second gear. The intermeshed solid lubricant-carrying gear and the intermeshed second gear can be lubricated with a lubricant flow from a primary lubrication system. The lubricant flow can be reduced or eliminated while the torque is communicated through the solid lubricant-carrying gear and an intermeshed second gear.

These and other features of the systems and methods of the subject disclosure will become more readily apparent to those skilled in the art from the following detailed description of the preferred embodiments taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, embodiments thereof will be described in detail herein below with reference to certain figures, wherein.

DETAILED DESCRIPTION OF THE PREFERRED EMBODIMENTS

Figure 1:
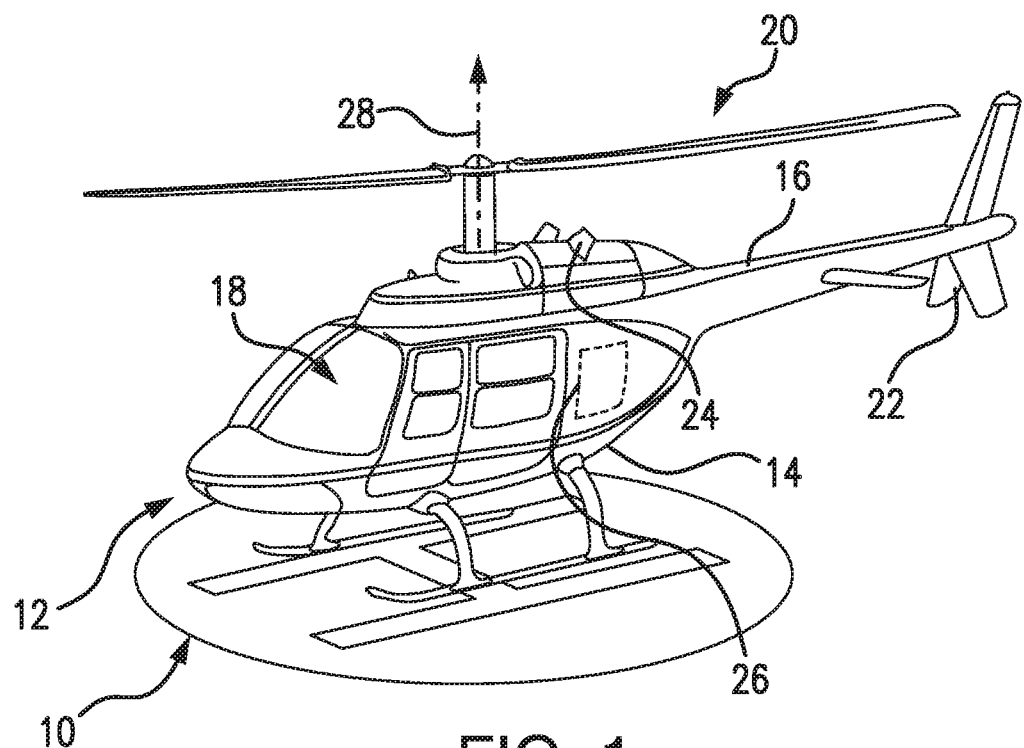
FIG. 1 is a schematic view of an exemplary embodiment of an aircraft constructed in accordance with the present disclosure, showing a rotorcraft (e.g., a helicopter) having a gearbox with a solid lubricant-carrying gear.

Reference will now be made to the drawings wherein like reference numerals identify similar structural features or aspects of the subject disclosure. For purposes of explanation and illustration, and not limitation, a partial view of an exemplary embodiment of a solid lubricant-carrying gear in accordance with the disclosure is shown in FIG. 2 and is designated generally by reference character 100. Other embodiments of solid lubricant-carrying gears, gearboxes having solid lubricant-carrying gears, and methods of providing secondary lubrication to gears in gear trains in accordance with the disclosure, or aspects thereof, are provided in FIGS. 1 and 2-6, as will be described. The systems and methods described herein can be used for providing secondary lubrication to gears and gear trains in aircraft, such as in rotorcraft during oil-out events, though the present disclosure is not limited to oil-out events or rotorcraft in general.

As described below, a secondary lubrication system is provided for a helicopter or other rotary wing aircraft that operates continuously and will continue to operate when the primary system fails. The secondary lubrication system is a passive system that operates without any intervention from sensors or an operator and is thus less prone to failures than other secondary lubrication systems and is not subject to operator error.

Figure 2:
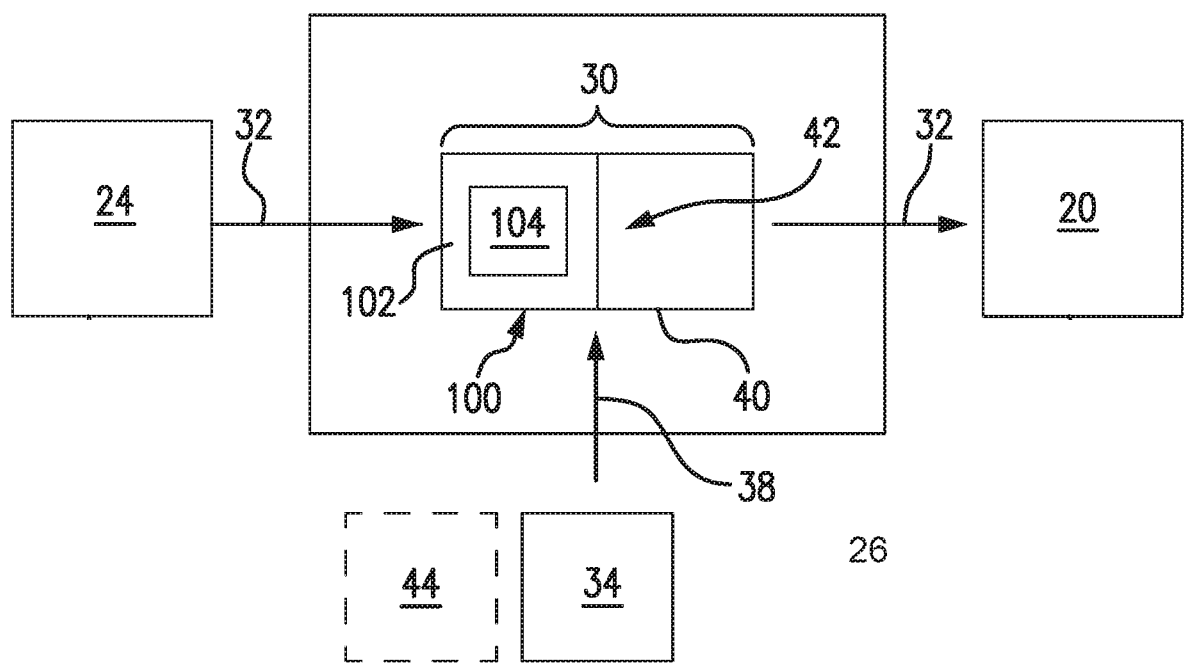
FIG. 2 is a schematic view of the gearbox of FIG. 1, showing the solid lubricant-carrying gear intermeshed with another gear in a gear train supported within the gearbox.

Referring to FIG. 1, an exemplary aircraft, e.g., a helicopter 10, is shown. Helicopter 10 includes an airframe 12 having a fuselage 14 and a longitudinally extending tail 16. Fuselage 14 defines a cabin 18 in an interior thereof and supports a main rotor 20. Longitudinally extending tail 16 mounts an anti-torque rotor 22. An engine 24 is carried by airframe 12 and is operably connected to main rotor 20 and anti-torque rotor 22 through a transmission system gearbox 26 having a one or more solid lubricant-carrying gear 100 (shown in FIG. 2), as will be described. Main rotor 20 is supported for rotation about a main rotor rotation axis 28 for providing lift to helicopter 10. While shown as a helicopter having a single main rotor 20 and anti-torque rotor 22 in FIG. 1, it is to be understood that aspects can be used with other types of helicopters including those with axially offset tandem rotors, tilt rotors, and/or coaxial rotors, such as rotorcraft-type aircraft employing X2® technology. Aspects can also be used in other contexts, such as spacecraft, fixed wing aircraft, automobiles, locomotives, marine craft and ships, and in industrial applications.

With reference to FIG. 2, gearbox 26 is shown. Gearbox 26 includes a gear train 30 having a solid lubricant-carrying gear 100 intermeshed with a gear 40. Engine 24 is operably connected to solid lubricant-carrying gear 100 to provide mechanical rotation 32 for rotating main rotor 20 about main rotor rotation axis 28 (shown in FIG. 1). Solid lubricant-carrying gear 100 communicates mechanical rotation 32 to main rotor 20 through intermeshed gear 40. A primary lubrication system 34 is disposed in fluid communication with gear train 30 for providing a flow of liquid lubricant 38 to gear train 30. Liquid lubricant 38 lubricates and cools gear train 30, e.g., solid lubricant-carrying gear 100 and gear 40, such as from friction associated with intermeshing gear teeth arranged on solid lubricant-carrying gear 100 and gear 40 within a gear mesh 42. Although particular types of gears are shown and described herein, it is to be understood and appreciated that other types of gear can benefit from the present disclosure such as spur gears, helical gears, bevel gears, and spiral-bevel gears by way of non-limiting example.

As will be appreciated by those of skill in the art, gear mesh 42 within a gearbox 26 may become lubricant starved or cease receiving sufficient lubricant for gear cooling from the primary lubrication system during loss-of-lubrication (LOL) events. Without sufficient lubrication, heat generated from friction of intermeshed gears 40 accumulates rapidly in the gears 40—potentially to the point where the mechanical properties of the material forming the gear 40 changes such that the gears 40 can no longer communicate mechanical energy through the intermesh of gears 40. At that point a conventional gear train may become unable to communicate mechanical rotation to the aircraft rotor system. To prevent this, some types rotorcraft to carry secondary lubrication systems. The secondary lubrication system typically provides a secondary flow of lubrication to the aircraft gear train to prolong the interval during which lubricant flow from the primary lubrication system can be reduced or interrupted. Such secondary lubrication systems generally provide sufficient time for an aircraft to land prior loss of power to the rotorcraft rotor system, which could otherwise follow shortly upon loss of lubrication from the primary lubrication, e.g., on the order of minutes in some types of aircraft.

In embodiments described herein a solid lubricant-carrying gear 100 is provided as the secondary lubrication system. More particularly, solid lubricant-carrying gear 100 includes a gear body 102 and a solid lubricant body 104 which melts at a melting temperature above that of the liquid lubricant to provide secondary lubrication to gear teeth via lubricating features, as will be described. Solid lubricant body 104 is fixed to gear body 102, rotates in concert with gear body 102, and provides a source of lubrication to gear train 30 in response to heating of gear body 102. In certain embodiments solid lubricant-carrying gear 100 serves as a secondary lubrication system for rotorcraft 10 (shown in FIG. 1). It is also contemplated that solid lubricant-carrying gear 100 can supplement a secondary lubrication system 44 of rotorcraft 10.

Figure 3:
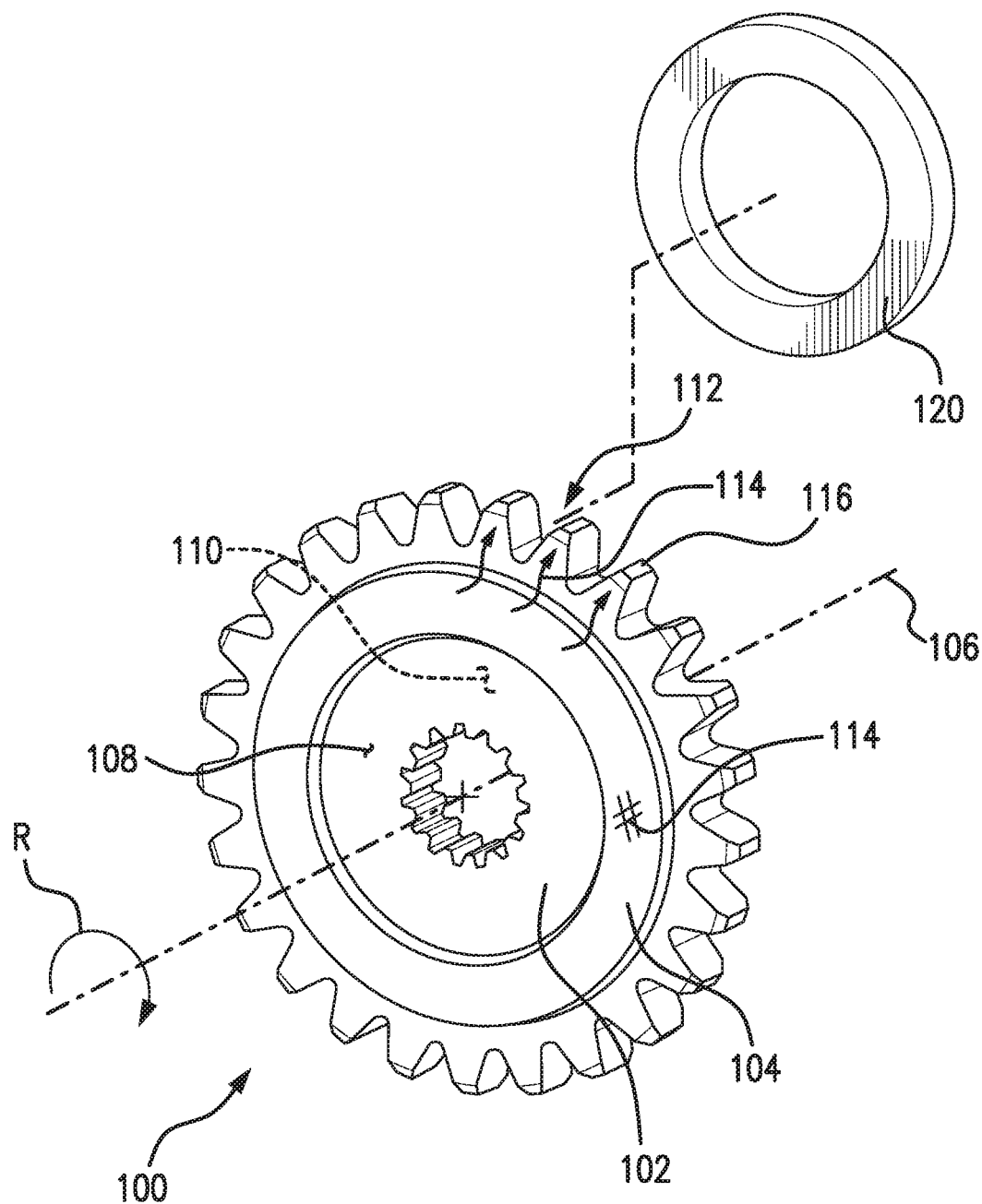
FIG. 3 is a perspective view of an exemplary embodiment of the solid lubricant-carrying gear of FIG. 1 according a first embodiment, showing a solid lubricant body coupled to a first surface of a gear body.

With reference to FIG. 3, solid lubricant-carrying gear 100 is shown. Solid lubricant-carrying gear 100 includes a gear body 102 and solid lubricant body 104. Gear body 102 is arranged along a rotation axis 106 and has a first surface 108, an axially opposite second surface 110, and an outward radial face 112 extending about rotation axis 106. Solid lubricant body 104 is coupled to gear body 102 and includes a lubricant 114. Lubricant 114 has a melting temperature above that of liquid lubricant 38 (shown in FIG. 2) communicated to the gear by primary lubrication system 34 (shown in FIG. 2). It is contemplated that, as lubricant 114 melts, centrifugal force associated with rotation R of solid lubricant-carrying gear 100 causes liquid lubricant 114 to radially outward and to outward radial face 112, wherein lubricant 114 is directed between gear teeth 116 to lubricate and cool gear teeth 116 arranged about outward radial face 112 as shown by arrows in FIG. 3. While shown as circular with uniform thickness relative to face 112, it is to be understood and appreciated that other shapes and varied thicknesses can be used as lubricant directing features to channel lubricant 114 between gear teeth 116.

In certain embodiments solid lubricant body 104 is a first lubricant body coupled to first surface 108 of solid lubricant body 104 and solid lubricant-carrying gear 100 includes a second solid lubricant body 120 coupled to second surface 110 of gear body 102. As will be appreciated by those of skill in the art in view of the present disclosure, second solid lubricant body 120 provides additional secondary lubrication to solid lubricant-carrying gear 100. As will also be appreciated by those of skill in the art in view of the present disclosure, solid lubricant-carrying gear 100 can provide a lightweight and/or relatively low cost secondary lubrication system, allows gearbox 26 (shown in FIG. 2) to be provisioned with a source of secondary lubrication without external provisioning and/or or housing penetrations, and can be arranged to conform with contour of gears within an existing gear train for retrofitting legacy rotorcraft. While shown in the illustrated exemplary embodiment as having two lubricant bodies, i.e., a first solid lubricant body 104 and second solid lubricant body 120, it is to be understood and appreciated that certain embodiments can include only a single solid lubricant body 104 one only one side of solid lubricant-carrying gear 100.

Figure 4A:
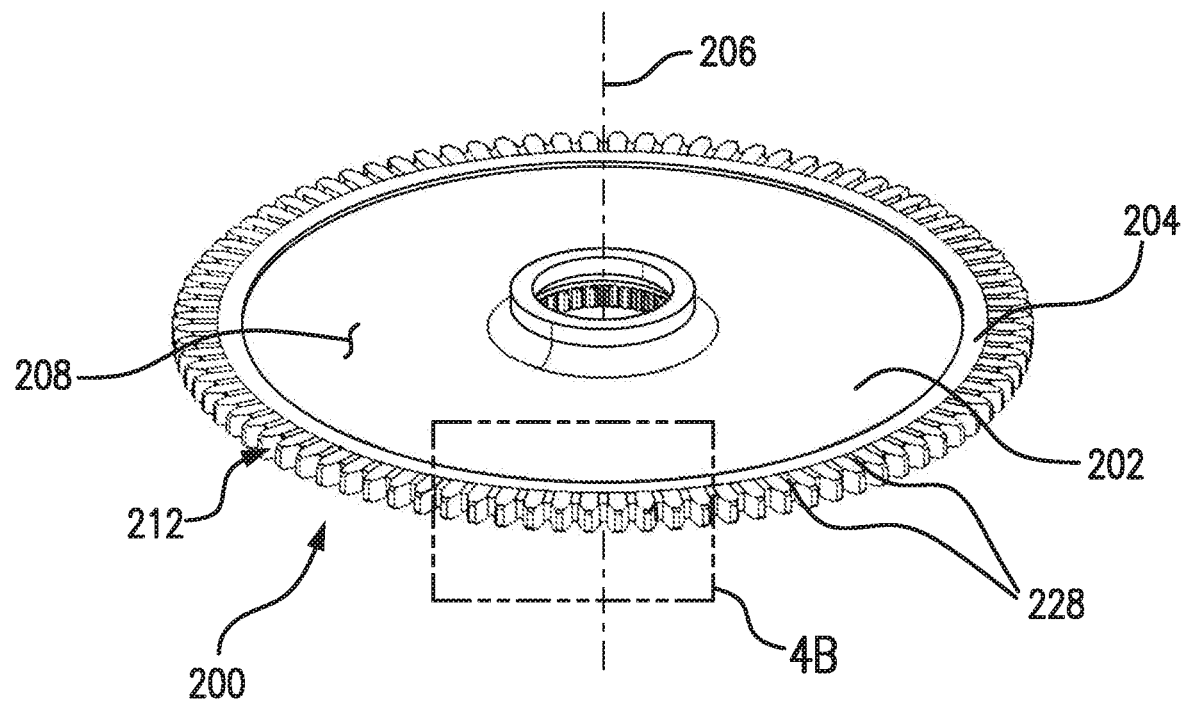
FIGS. 4A-4F are perspective views of additional embodiments of the solid lubricant-carrying gear of FIG. 1, gear bodies having lubricant directing features in the form of surface channels and internal channels, solid lubricant bodies being arranged about the outward radial face of the gear body, respectively.

With reference to FIG. 4A, a solid lubricant-carrying gear 200 is shown. Solid lubricant-carrying gear 200 is similar to solid lubricant-carrying gear 100 (shown in FIG. 3) and additionally includes one or more lubricant directing features, e.g., one or more surface channel 228, for directing secondary lubricant to gear teeth of gear 200. In this respect solid lubricant-carrying gear 200 has a solid lubricant body 204 is coupled to a gear body 202. Gear body 202 defines within a first surface 208 the one or more surface channel 228. Solid lubricant body 204 is positioned against a gear body first surface 208 and is arranged radially between rotation axis 206 and gear body outward radial face 212 such that solid lubricant body 204 abuts the one or more surface channel 228 (shown in FIG. 4B).

Figure 4B:
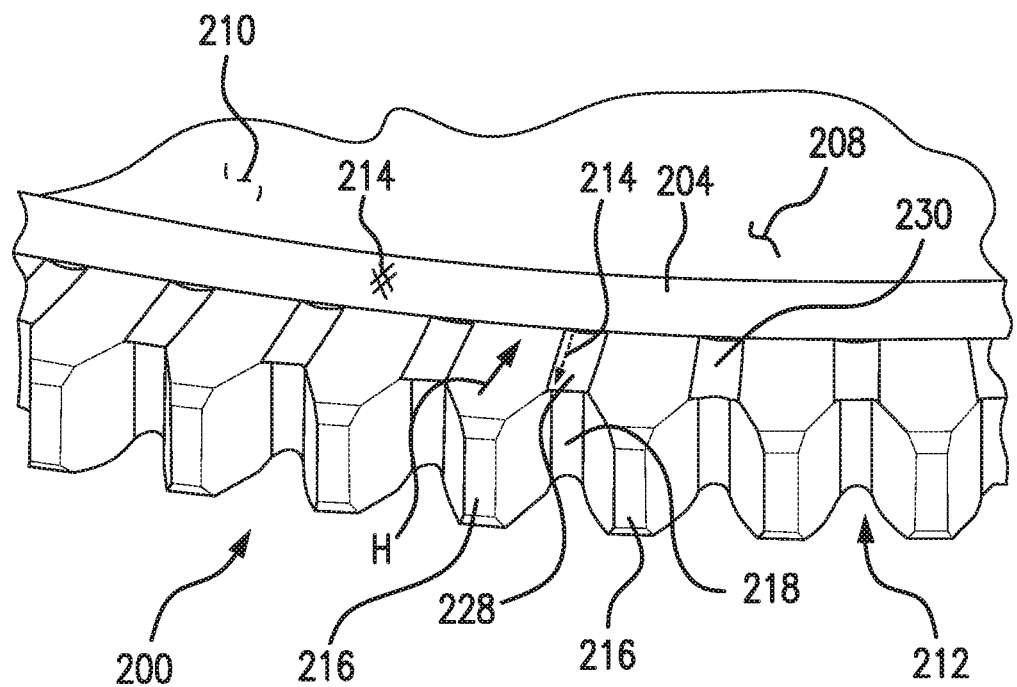

As shown in FIG. 4B, the one or more surface channel 228 extends radially between solid lubricant body 204 and a bottom land 218. Bottom land 218 is arranged on outward radial face 212 of gear body 202 and between gear teeth 216, which are circumferentially adjacent to one another on outward radial face 212. In the illustrated exemplary embodiment surface channel 228 extends across first surface 208 between solid lubricant body 204 and bottom land 218 such that, as solid lubricant 214 contained within solid lubricant body 204 melts from heat H communicated to solid lubricant body 204 through gear body 202, liquid lubricant 214 flows to bottom land 218 through surface channel 228 to provide secondary lubrication to gear body 202.

In certain embodiments surface channel 228 is a first surface channel 228 and gear body 202 includes at least one second surface channel 230. Second surface channel 230 is defined by first surface 208 and is circumferentially offset from first surface channel 228 about rotation axis 206 (shown in FIG. 4A). In accordance with certain embodiments solid lubricant body 204 can be a first solid lubricant body 204 and solid lubricant-carrying gear 200 can include a second solid lubricant body 220, second solid lubricant body 220 positioned on a second surface 210 of gear body 202. It is contemplated that second surface 210 can define one of more surface channel similar to surface channel 228 with the difference that the one or more channel extends across second surface 210 between second solid lubricant body 220 and bottom land 218.

Figure 4C:
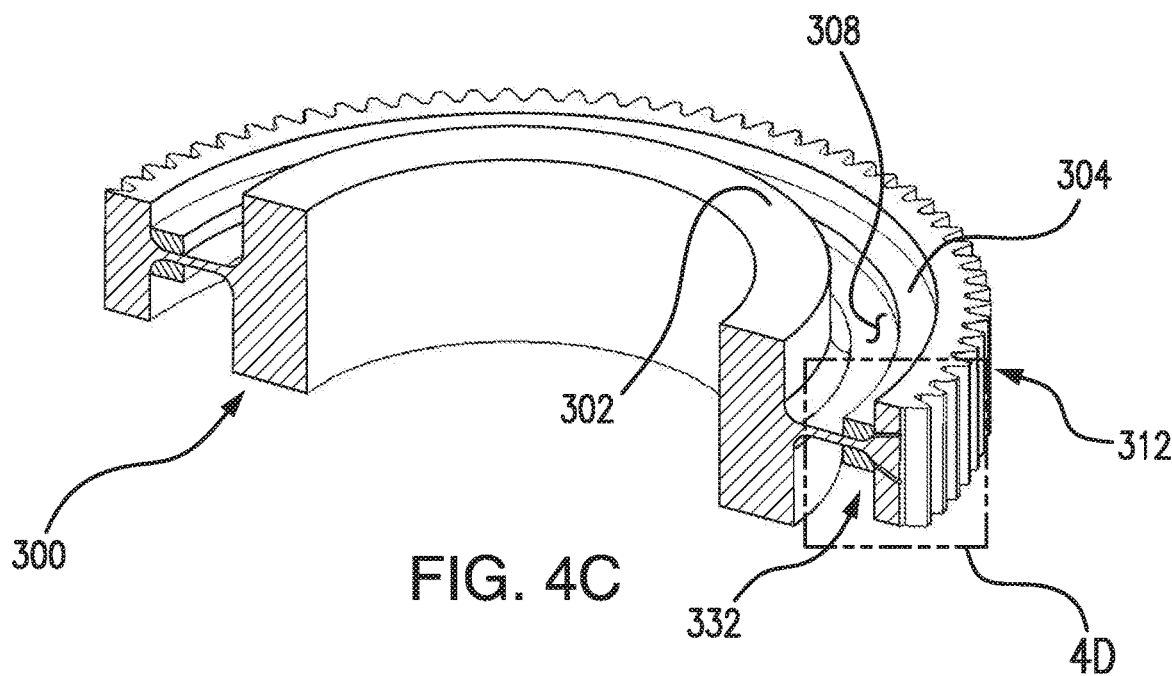

With reference to FIG. 4C, a solid lubricant-carrying gear 300 is shown. Solid lubricant-carrying gear 300 is similar to solid lubricant-carrying gear 100 (shown in FIG. 3) and additionally includes one or more lubricant directing feature in the form of an internal channel 332 for directing secondary lubricant to gear teeth of solid lubricant-carrying gear 300. In this respect solid lubricant-carrying gear 300 has gear body 302 with a solid lubricant body 304. Solid lubricant body 304 is coupled to gear body 302 and positioned against a first surface 308 of gear body 302. The one or more internal channel 332 extends between solid lubricant body 304 and outward radial face 312 of gear body 302.

Figure 4D:
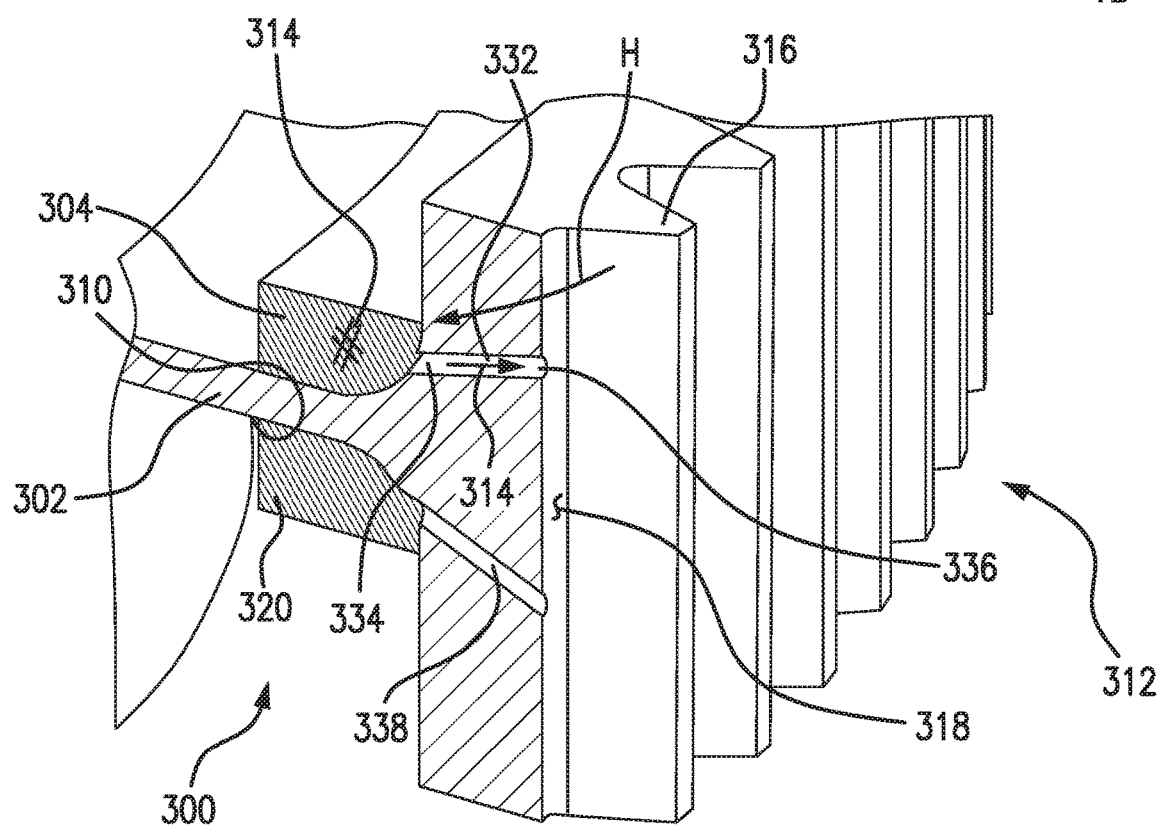

As shown in FIG. 4D, gear body 302 defines internal channel 332. Internal channel 332 extends radially between solid lubricant body 304 and a bottom land 318. Bottom land 318 is arranged on outward radial face 312 of gear body 302 between circumferentially adjacent gear teeth 316, only one of which is labeled in FIG. 4D, and which are arranged on gear body outward radial face 312. In the illustrated exemplary embodiment internal channel 332 extends internally through an interior 316 of gear body 302 between an inlet 334, located 318 radially adjacent to solid lubricant body 304, and an outlet 336, located on outward radial face 312 and at an axially more central position within bottom land 318. As will be appreciated by those of skill in the art in view of the present disclosure, as lubricant 314 contained within solid lubricant body 304 melts from heat H communicated to solid lubricant body 304 through gear body 302, liquid lubricant 314 flows to directly to bottom land 318 through internal channel 332 to provide secondary lubrication to gear body 302.

In the illustrated exemplary embodiment solid lubricant body 304 is a first solid lubricant body 304 and solid lubricant-carrying gear 300 has a second solid lubricant body 320. Second solid lubricant body 320 is positioned on gear body second surface 310 between rotation axis and outward radial face 312. A second internal channel 338 is defined within gear body 302, second internal channel 338 extending between second solid lubricant body 320 and bottom land 318, second internal channel 338 cooperating with first internal channel 332 to provide lubrication and cooling to gear teeth 316 through bottom land 318.

Figure 4E:
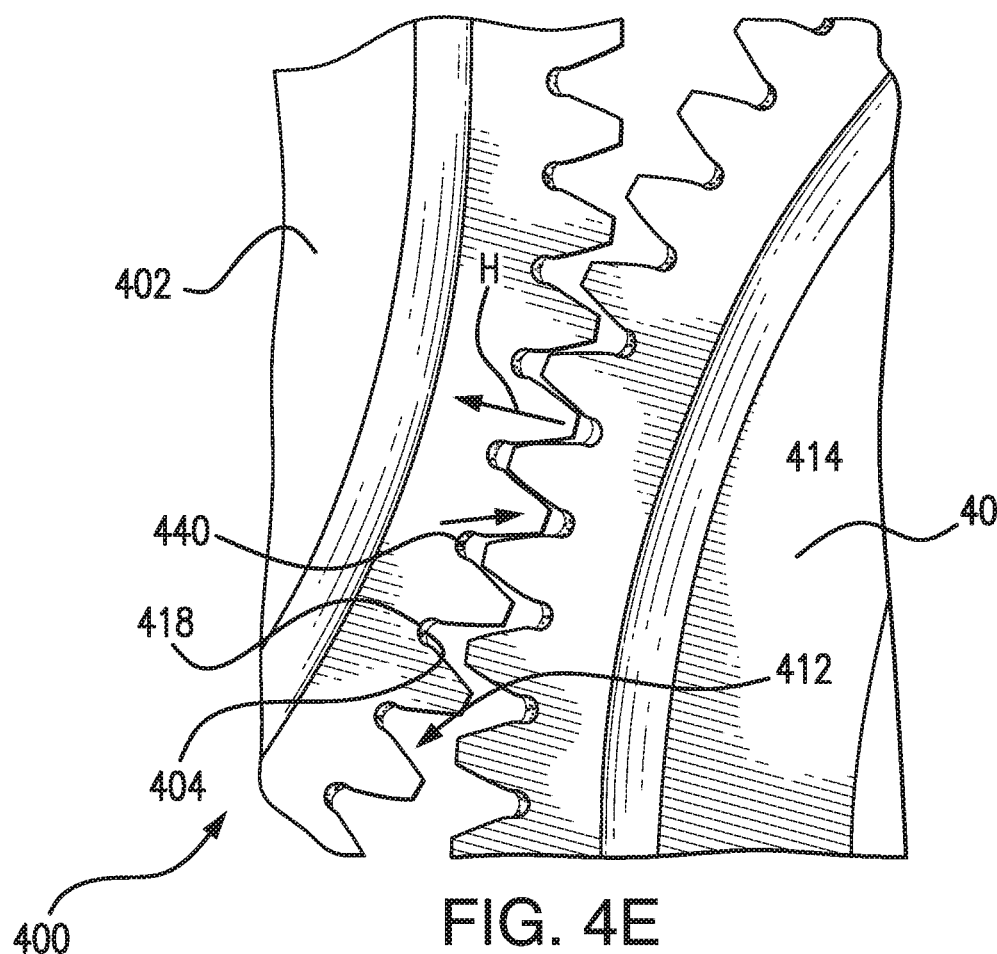
Figure 4F:
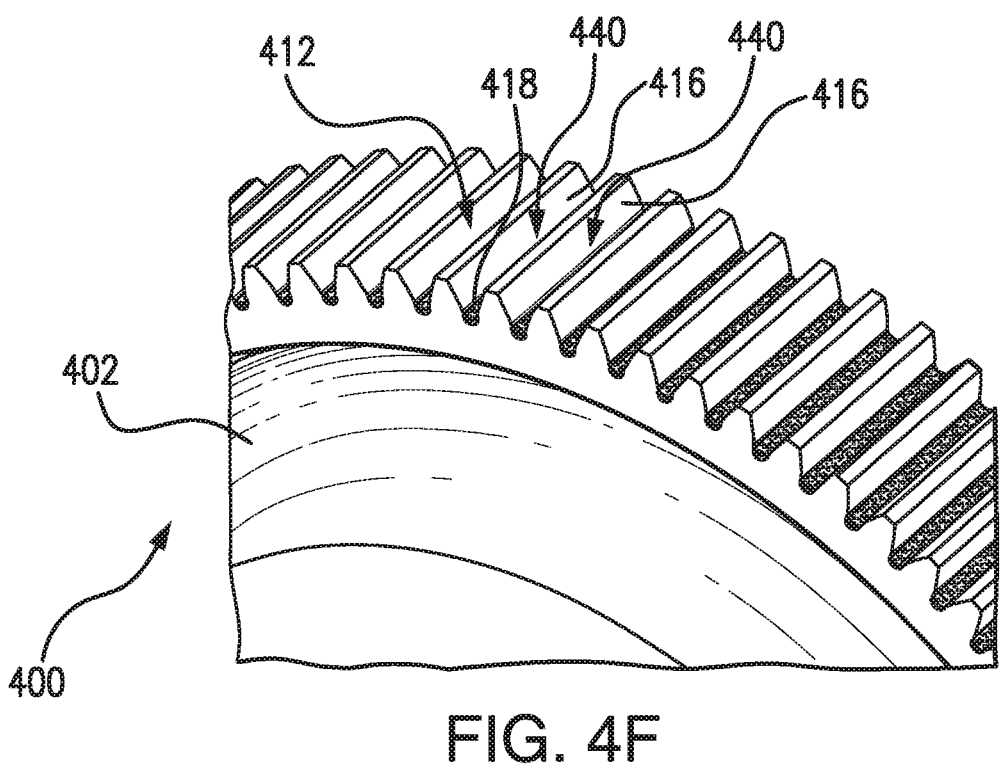

With reference to FIGS. 4E and 4F, a solid lubricant-carrying gear 400 is shown. Solid lubricant-carrying gear 400 is similar to solid lubricant-carrying gear 100 (shown in FIG. 3) and additionally includes a solid lubricant body 404. Solid lubricant body 404 is arranged on outward radial face 412 of gear body 402. More particularly, as shown in FIG. 4F, solid lubricant body 404 is arranged within a bottom land 418 defined between circumferentially adjacent teeth 416 and between the circumferentially adjacent teeth 416. This places solid lubricant body 404 in proximity to intermeshed circumferentially adjacent teeth 416, improving responsiveness of solid lubricant body 404 to heating by limiting the distance that heat H must travel through gear body 402 prior to melting solid lubricant body 404. As will be appreciated by those of skill in the art in view of the present disclosure, issue of liquid lubricant 414 begins rapidly upon heating.

In the illustrated exemplary embodiment solid lubricant body 404 is a first solid lubricant body 404 and solid lubricant-carrying gear 400 includes second solid lubricant body 440. Second solid lubricant body 440 is arranged within a bottom land 442 adjacent to bottom land 418. Second solid lubricant body 440 provides additional liquid lubricant 414 to solid lubricant-carrying gear 400, increasing the interval during which mechanical rotation 32 (shown in FIG. 2) can be communicated through gear train 30 (shown in FIG. 2) with reduced (or eliminated) lubrication from primary lubrication system 34 (shown in FIG. 2).

Figure 5A:
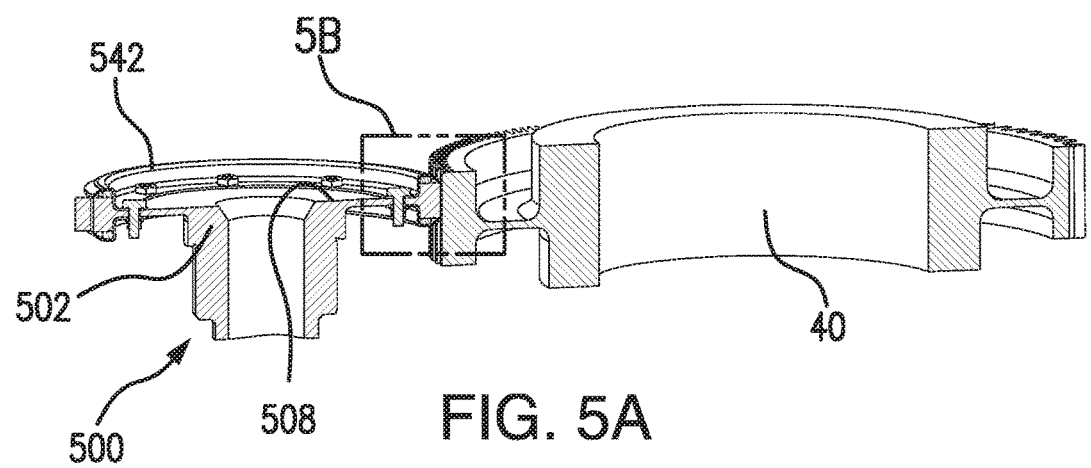
FIGS. 5A-5D are perspective views of further embodiments of the solid lubricant-carrying gear of FIG. 1, showing solid lubricant bodies retained to gear bodies by fastened and press-fit brackets, respectively.
Figure 5B:
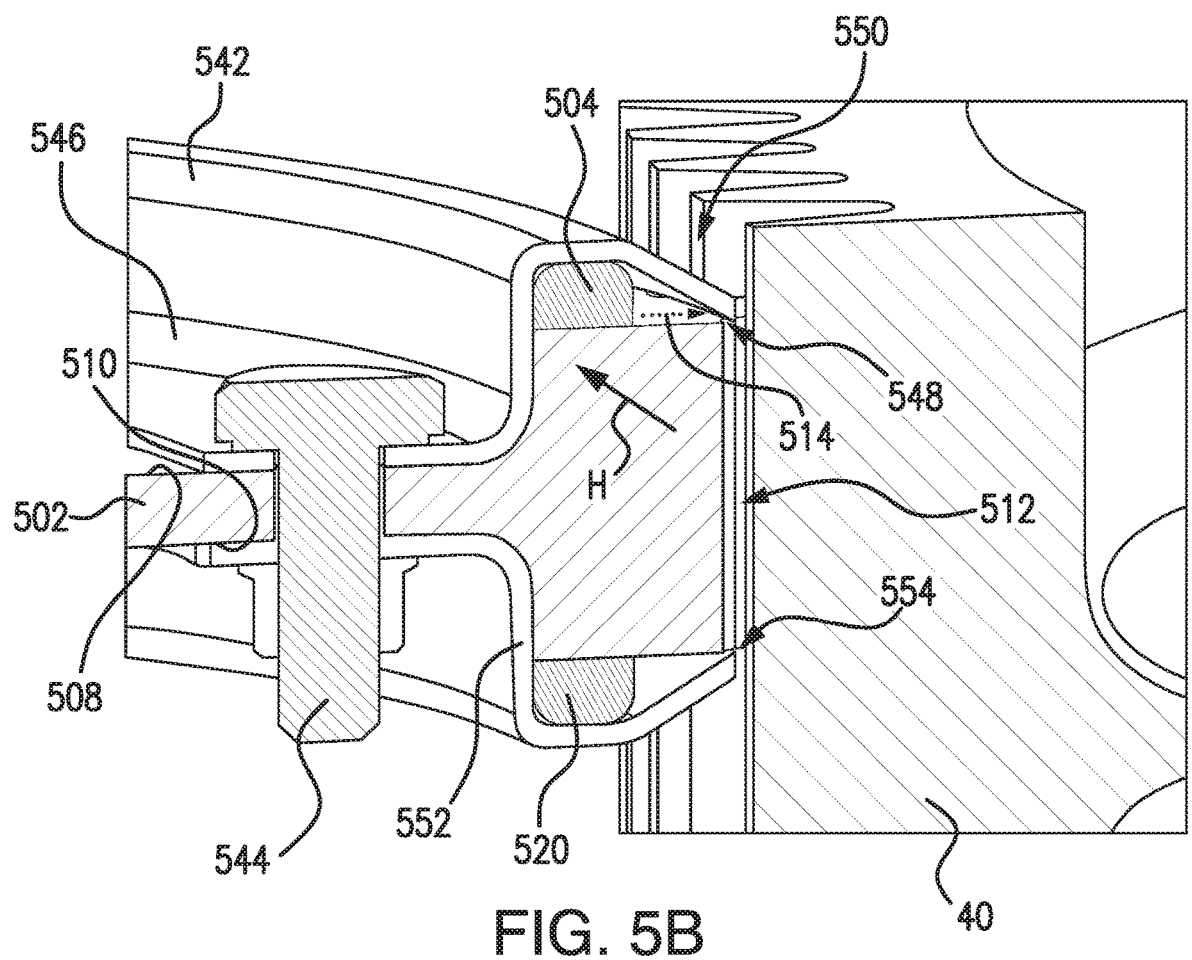

With reference to FIGS. 5A and 5B, a solid lubricant-carrying gear 500 is shown. Solid lubricant-carrying gear 500 is similar to solid lubricant-carrying gear 100 (shown in FIG. 3) and additionally includes a bracket 542. Bracket 542 has a cantilevered profile and is fixed to gear body first surface 508 to couple a solid lubricant body 504 (shown in FIG. 5B) to gear body 502. Fixation of solid lubricant body 504 is such that, responsive to heat H (shown in FIG. 5B) from friction generated with intermeshed gear 40, solid lubricant body 504 issues a flow of liquid lubricant 514 for lubricating solid lubricant-carrying gear 500 and intermeshed gear 40.

In the illustrated exemplary embodiment bracket 542 is coupled to gear body 502 by a fastener 544. Fastener 544 is received within gear body 502 at a radially inner location 546 and defines a lubricant issue aperture 548 at a radially outer location 550 with gear body first surface 510. Issue aperture 548 is defined at gear body outward radial face 512 and is sized to meter flow of liquid lubricant 514 to outward radial face 512. As will be appreciated by those of skill in the art in view of the present disclosure, selection of a flow area defined by issue aperture 548 allows for control of the flow rate of liquid lubricant 514 from solid lubricant body 404.

As also shown in FIGS. 5A and 5B, solid lubricant-carrying gear 500 includes a second solid lubricant body 520. Second solid lubricant body 520 is retained against gear body second surface 510 by a second bracket 552, fastener 544 coupling second bracket 552 against gear body 502. Gear body second surface 510 and second bracket 552 define between one another a second issue aperture 554, second issue aperture 554 arranged to flow liquid lubricant 514 from second solid lubricant body 520 to outward radial face 512.

As will be appreciated by those of skill in the art in view of the present disclosure, second solid lubricant body 520 provides an additional source of secondary lubrication for gear train 30 (shown in FIG. 2), increasing the interval during which gear train 30 can communicate mechanical rotation 32 with reduced (or eliminated) lubricant from primary lubrication system 34 (shown in FIG. 2). Although shown as having two solid lubricant bodies, it is to be understood and appreciated that solid lubricant-carrying gear 500 can have a single solid lubricant body, as suitable for an intended application.

Figure 5C:
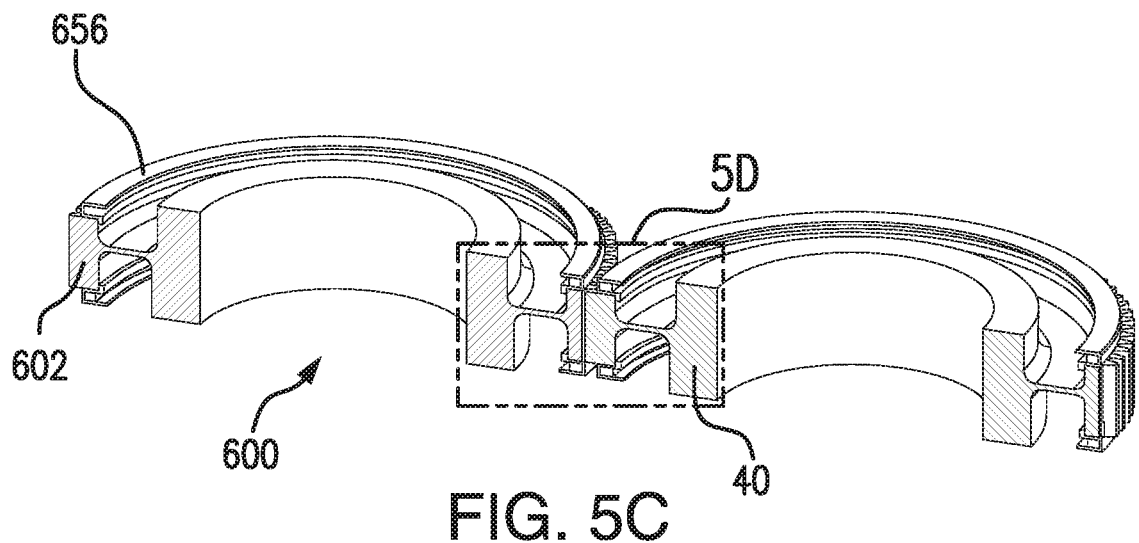
Figure 5D:
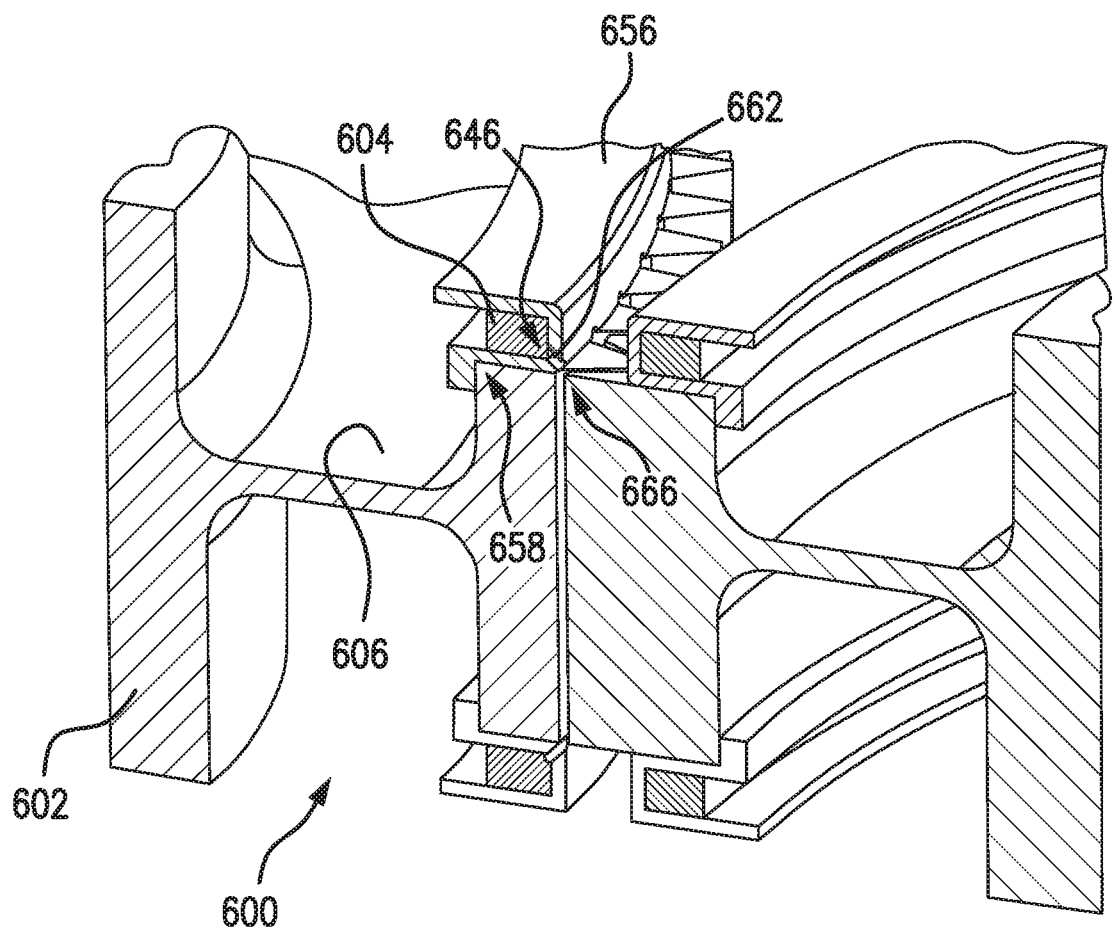

With reference to FIGS. 5C and 5D, a solid lubricant-carrying gear 600 is shown. Solid lubricant-carrying gear 600 is similar to solid lubricant-carrying gear 100 and additionally includes a bracket 656. Bracket 656 has a U-shaped profile and is coupled to gear body 602 with a press-fit 658, press-fit 658 fixing bracket 656 within the contour of gear body first surface 606. A solid lubricant body 604 is arranged within the U-shaped profile of bracket 656, bracket 656 thermally coupling gear body 602 to solid lubricant body 604. Press-fit 658 can be an interference fit, bracket 656 having a diameter which is slightly larger than a diameter defined within a rim 660 of gear body 602.

Bracket 656 defines one or more bracket channel 662. Bracket channel 662 extends radially through bracket 656 and has a radially inner inlet 664 and a radially outer outlet 666. Bracket channel inlet 664 is adjacent to solid lubricant body 604. Bracket channel outlet 666 is adjacent to outward radial face 612. As will be appreciated by those of skill in the art in view of the present disclosure, liquid lubricant 614 issuing from solid lubricant body 604 is metered through the minimum flow area of bracket channel 662, bracket 656 thereby defining a lubricant directing feature. The metering provided by bracket channel 662 provides control of the rate of issue of liquid lubricant 614 from solid lubricant body 604. As will also be appreciated by those of skill in the art in view of the present disclosure, use of bracket 656 allows for metered supply of liquid lubricant 614 without altering the structure of gear body 602, which facilitates retrofitting gear body 602 as the structure of gear body 602 remains substantially unchanged.

Figure 6:
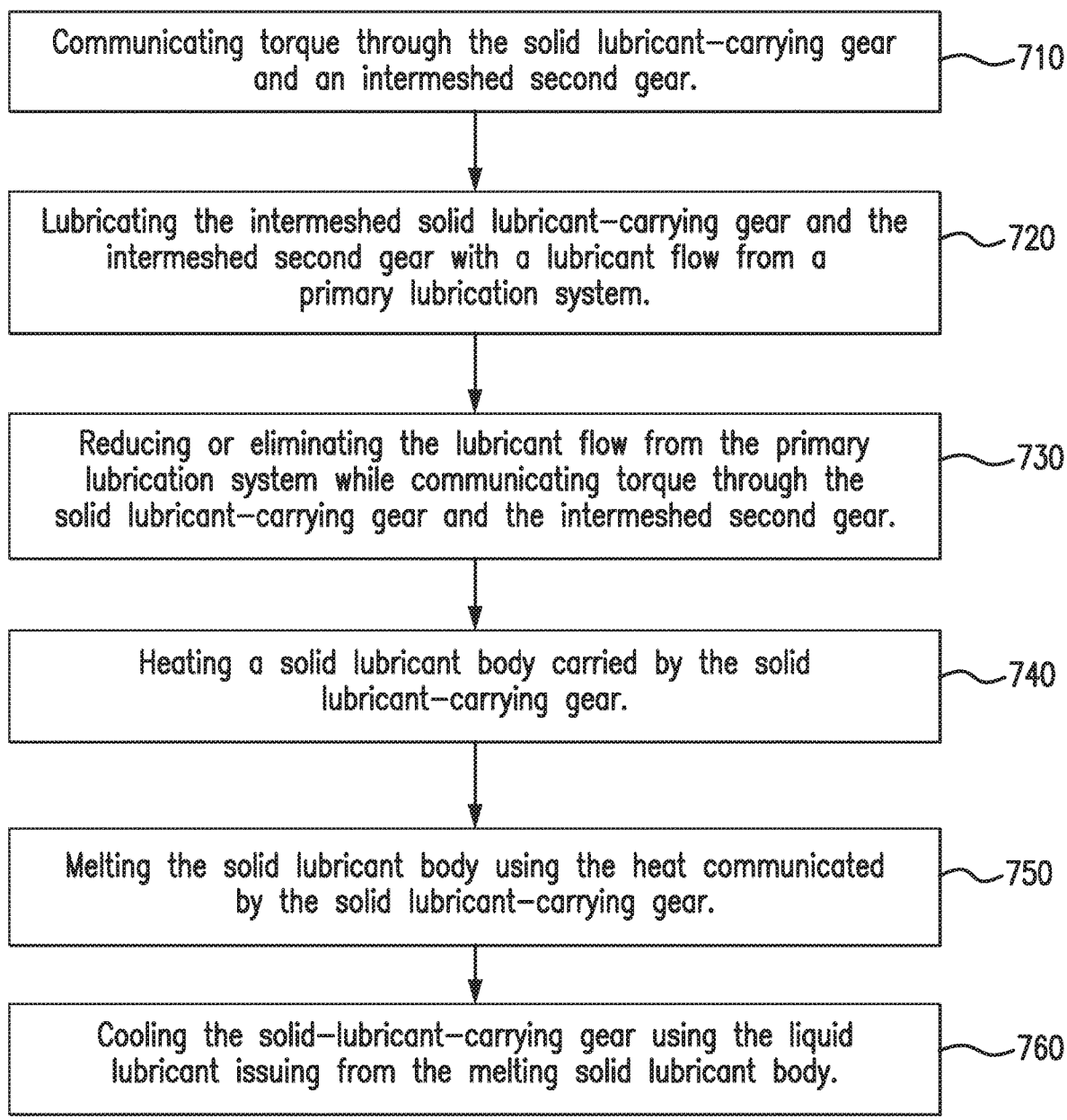
FIG. 6 is a block diagram of a method of cooling a gear, showing steps of the method according to an illustrative embodiment.

With reference to FIG. 6, a method 700 of lubricating a gear, e.g., solid lubricant-carrying gear 100 (shown in FIG. 2), is shown. Method 700 includes heating a solid lubricant body, e.g., solid lubricant body 104 (shown in FIG. 2) carried by the solid lubricant-carrying gear, as shown with box 740. Heating the solid lubricant body can include communicating heat directly between the solid lubricant body and a gear body, e.g., gear body 102. Heating the solid lubricant body can include communicating heat through an intervening bracket, e.g., bracket 542 (shown in FIG. 5A). The solid lubricant body can be melted using the heat communicated by the solid lubricant-carrying gear to the solid lubricant body, as shown with box 750. The melted lubricant from the solid lubricant body can be directed in a space located between adjacent pairs of gear teeth of the solid lubricant-carrying gear. The gear is cooled using the directed liquid lubricant, e.g., liquid lubricant 114 (shown in FIG. 2), issuing from the melting solid lubricant body, as shown with box 760.

In certain embodiments torque can be communicated through the solid lubricant-carrying gear and an intermeshed second gear, e.g., intermeshed second gear 40 (shown in FIG. 2), as shown with box 710. The intermeshed solid lubricant-carrying gear and the intermeshed second gear can be lubricated with a lubricant flow from a primary lubrication system, e.g., a flow of liquid lubricant 38 (shown in FIG. 2) from primary lubrication system 34 (shown in FIG. 1), as shown with box 720. The lubricant flow from the primary lubricant system can be reduced or eliminated while the torque is communicated through the solid lubricant-carrying gear and an intermeshed second gear, as shown with box 730, such as during a lubricant out event for example.

The methods and systems of the present disclosure, as described above and shown in the drawings, provide for gearboxes systems with superior properties including secondary lubrication supplies integrally housed within the gear box and carried gears within the gearbox. While exemplary lubricant directing features are shown and described above it is to be understood and appreciated that other types of lubricant directing features can be employed and remain within the scope of the present as the apparatus and methods of the subject disclosure have been shown and described with reference to preferred embodiments; those skilled in the art will readily appreciate that changes and/or modifications may be made thereto without departing from the scope of the subject disclosure.

What is claimed is:

1. A solid lubricant-carrying gear which is lubricated by a liquid lubricant communicated to the gear by a primary lubrication system, the gear comprising:
   a gear body arranged along a rotation axis having a first surface, an axially opposite second surface, and an outward radial face extending about the rotation axis having gear teeth, wherein a bottom land is arranged about the outward radial face of the gear body and between the gear teeth;
   lubricant directing features defined by the gear body; and
   a lubricant body coupled to the gear body, wherein the lubricant body comprises a solid lubricant which melts at a melting temperature above that of the liquid lubricant to provide secondary lubrication to the gear teeth via the lubricant directing features, wherein the lubricant body is arranged radially between the rotation axis and the outward radial face of the gear body such that the solid lubricant is disposed at an outer perimeter of the gear and adjacent the gear teeth,
   wherein the lubricant directing features comprise a channel formed in the first surface of the gear body, the channel extending radially from the lubricant body to the bottom land and circumferentially offset from an adjacent channel, such that the liquid lubricant flows radially outwardly to the bottom land through the channels, wherein the channel includes a first end adjacent the bottom land and a second end terminating at the lubricant body.

2. The gear as recited in claim 1, wherein the lubricant body is positioned against the first surface of the gear body.

3. The gear as recited in claim 1, wherein the lubricant body is a first lubricant body and further comprising a second lubricant body, the first lubricant body positioned on the gear body first surface and the second lubricant body positioned on the gear body second surface.

4. The gear as recited in claim 1, wherein the lubricant body includes one lubricant body, which is disposed adjacent the outward radial face of the gear body.

5. A gearbox to transmit torque from an engine to a driven element, comprising:
   a housing;
   a gear train having a first gear as recited in claim 1, the first gear supported for rotation about the rotation axis within the housing; and
   the liquid lubricant disposed within the housing to lubricate the first gear as the first gear intermeshes with a second gear of the gear train.

6. The gearbox as recited in claim 5, wherein the lubricant body is a first lubricant body and further comprising a second lubricant body, the first lubricant body positioned on the gear body first surface and the second lubricant body on the gear body second surface.

7. An aircraft comprising a transmission system comprising the gearbox of claim 5.

8. A solid lubricant-carrying gear which is lubricated by a liquid lubricant communicated to the gear by a primary lubrication system, the gear comprising:
   a gear body arranged along a rotation axis having a first surface, an axially opposite second surface, and an outward radial face extending about the rotation axis having gear teeth, wherein a bottom land is arranged about the outward radial face of the gear body and between the gear teeth;
   lubricant directing features defined by the gear body; and
   a lubricant body coupled to the gear body, wherein the lubricant body comprises a solid lubricant which melts at a melting temperature above that of the liquid lubricant to provide secondary lubrication to the gear teeth via the lubricant directing features, wherein the lubricant body is arranged radially between the rotation axis and the outward radial face of the gear body such that the solid lubricant is disposed at an outer perimeter of the gear and adjacent the gear teeth,
   wherein the lubricant directing features comprise a channel formed in the first surface of the gear body, the channel extending radially from the lubricant body to the bottom land and circumferentially offset from an adjacent channel, such that the liquid lubricant flows radially outwardly to the bottom land through the channels, wherein the channel extends between a first end adjacent the bottom land and a second end adjacent the lubricant body, wherein the second end is disposed adjacent the outward radial face of the gear body.

9. The gear as recited in claim 8, wherein the lubricant body is positioned against the first surface of the gear body.

10. The gear as recited in claim 8, wherein the lubricant body is a first lubricant body and further comprising a second lubricant body, the first lubricant body positioned on the gear body first surface and the second lubricant body positioned on the gear body second surface.

11. The gear as recited in claim 1, wherein the lubricant body includes one lubricant body, which is disposed adjacent the outward radial face of the gear body.

12. A gearbox to transmit torque from an engine to a driven element, comprising:
   a housing;
   a gear train having a first gear as recited in claim 8, the first gear supported for rotation about the rotation axis within the housing; and
   the liquid lubricant disposed within the housing to lubricate the first gear as the first gear intermeshes with a second gear of the gear train.

13. The gearbox as recited in claim 12, wherein the lubricant body is a first lubricant body and further comprising a second lubricant body, the first lubricant body positioned on the gear body first surface and the second lubricant body on the gear body second surface.

14. An aircraft comprising a transmission system comprising the gearbox of claim 12.

15. A solid lubricant-carrying gear which is lubricated by a liquid lubricant communicated to the gear by a primary lubrication system, the gear comprising:
   a gear body arranged along a rotation axis having a first surface, an axially opposite second surface, and an outward radial face extending about the rotation axis having gear teeth, wherein a bottom land is arranged about the outward radial face of the gear body and between the gear teeth;
   lubricant directing features defined by the gear body; and
   a lubricant body coupled to the gear body, wherein the lubricant body comprises a solid lubricant which melts at a melting temperature above that of the liquid lubricant to provide secondary lubrication to the gear teeth via the lubricant directing features, wherein the lubricant body is arranged radially between the rotation axis and the outward radial face of the gear body such that the solid lubricant is disposed at an outer perimeter of the gear and adjacent the gear teeth, wherein the lubricant directing features comprise a channel formed in the first surface of the gear body, the channel extending radially from the lubricant body to the bottom land and circumferentially offset from an adjacent channel, such that the liquid lubricant flows radially outwardly to the bottom land through the channels, wherein the channel extends a length less than half a distance between the bottom land and the rotation axis.

16. The gear as recited in claim 15, wherein the lubricant body is positioned against the first surface of the gear body.

17. The gear as recited in claim 15, wherein the lubricant body is a first lubricant body and further comprising a second lubricant body, the first lubricant body positioned on the gear body first surface and the second lubricant body positioned on the gear body second surface.

18. The gear as recited in claim 15, wherein the lubricant body includes one lubricant body, which is disposed adjacent the outward radial face of the gear body.

19. A gearbox to transmit torque from an engine to a driven element, comprising:
- a housing;
- a gear train having a first gear as recited in claim 1, the first gear supported for rotation about the rotation axis within the housing; and the liquid lubricant disposed within the housing to lubricate the first gear as the first gear intermeshes with a second gear of the gear train.

20. An aircraft comprising a transmission system comprising the gearbox of claim 19.

\* \* \* \* \*